United States Patent
Hotchkiss (10) Patent No.: US 9,395,932 B2
(45) Date of Patent: Jul. 19, 2016

(54) VIRTUAL DRIVE MAPPING

(71) Applicant: Avago Technologies General IP (Singapore) Pte. Ltd., Singapore (SG)

(72) Inventor: Thomas Richmond Hotchkiss, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/882,590

(22) Filed: Oct. 14, 2015

(65) Prior Publication Data

US 2016/0034222 A1    Feb. 4, 2016

Related U.S. Application Data

(63) Continuation of application No. 11/636,108, filed on Dec. 8, 2006.

(51) Int. Cl.
*G06F 3/06* (2006.01)

(52) U.S. Cl.
CPC ............ *G06F 3/0631* (2013.01); *G06F 3/0605* (2013.01); *G06F 3/0607* (2013.01); *G06F 3/067* (2013.01); *G06F 3/0664* (2013.01); *G06F 3/0665* (2013.01); *G06F 3/0683* (2013.01); *G06F 3/0689* (2013.01)

(58) Field of Classification Search
CPC ... G06F 3/0631; G06F 3/0607; G06F 3/0689; G06F 3/0605; G06F 3/0664; G06F 3/0665; G06F 3/067; G06F 3/0683; G06F 3/06
See application file for complete search history.

(56) References Cited

U.S. PATENT DOCUMENTS

| | | | |
|---|---|---|---|
| 5,598,549 A | 1/1997 | Rathunde | |
| 6,266,784 B1 | 7/2001 | Hsiao et al. | |
| 6,311,251 B1 * | 10/2001 | Merritt | G06F 3/0608 711/114 |
| 6,487,633 B1 * | 11/2002 | Horst | G06F 3/061 711/112 |

(Continued)

OTHER PUBLICATIONS

Free Computer Tutorials, ("How Big Is Your Hard Drive?"), Nov. 24, 2005, pp. 1-3, http://web.archive.org/web/20051124203656/http://www.homeandlearn.co.uk/BC/bcs1p5.html.

(Continued)

*Primary Examiner* — Christopher D Birkhimer (57) ABSTRACT

The automatic mapping of a set of physical drives to virtual drives is disclosed. Given a maximum set of n physical servers, $S_1$-$S_n$, and a maximum set of m physical drives, $D_1$-$D_m$, a mapping of a set of virtual drives, $V_1$-$V_n$, to the physical drives $D_1$-$D_m$, is created, assuming n and m are fixed and known, and one virtual drive is created per server. Physical drives of size Dsize are organized into a maximum of p "Stripe Sets" $SS_1$-$SS_p$, each Stripe Set containing an equal number of physical drives. Each virtual drive will have a size, Vsize=(m*Dsize)/n (rounded down to the nearest integer). Virtual drives are mapped sequentially to Stripe Sets, starting with $V_1$ mapped to $SS_1$. Successive virtual drives are mapped to Stripe Sets until all virtual drives have been mapped to a Stripe Set.

20 Claims, 6 Drawing Sheets

(56) References Cited

U.S. PATENT DOCUMENTS

| | | | |
|---|---|---|---|
| 6,581,135 B2 | 6/2003 | Nakano et al. | |
| 6,591,338 B1* | 7/2003 | Horst | G06F 3/061 |
| | | | 711/114 |
| 6,591,339 B1* | 7/2003 | Horst | G06F 3/061 |
| | | | 711/114 |
| 6,728,831 B1 | 4/2004 | Bridge | |
| 6,795,895 B2* | 9/2004 | Merkey | G06F 11/1076 |
| | | | 711/114 |
| 6,834,326 B1 | 12/2004 | Wang et al. | |
| 6,848,034 B2 | 1/2005 | Cohn et al. | |
| 6,862,609 B2* | 3/2005 | Merkey | G06F 11/1076 |
| | | | 709/214 |
| 6,895,467 B2 | 5/2005 | Lubbers et al. | |
| 2003/0041211 A1* | 2/2003 | Merkey | G06F 11/1076 |
| | | | 711/114 |
| 2003/0070043 A1* | 4/2003 | Merkey | G06F 11/1076 |
| | | | 711/114 |
| 2003/0097487 A1 | 5/2003 | Rietze et al. | |
| 2003/0188114 A1 | 10/2003 | Lubbers et al. | |
| 2004/0111559 A1 | 6/2004 | Heil | |

OTHER PUBLICATIONS

Advanced Computers & Network Corporation, ("Raid 0: Striped Disk Array Without Fault Tolerance"), Aug. 30, 2000, pp. 1-2, http://web.archive.org/web/20000830103614/http://www.acnc.com/04_01_00.html.

Charles M. Kozierck, ("Striped Width and Stripe Size"), Apr. 17, 2001, pp. 1-5, http://www.pcguide.com/perf/hdd/perf/raid/concepts/perfStripe-c.html.

Jim Foley, ("Converting Basic Disks to Dynamic Disks"), Nov. 25, 2005, pp. 1-5, http://web.archive.org/web/20051125005208/http://www.theeldergeek.com/hard_drives_10.htm.

Webopedia ("Hot Plugging"), Apr. 10, 2001, pp. 1-2, http://web.archive.org/web/20010410183539/http://webopeia.com/TERM/H/hot_plugging.html.

Laurier Brantford, ("Determining Available Space & Size of Hard Drive"), Feb. 21, 2002, p. 1, http://info.wlu.ca/its/faq/diskspace.shtml.

Mark Kyrnin, ("What is RAID?"), May 14, 2005, pp. 1-4, http://web.archive.org/web/20050514002957/http://compreviews.about.com/od/storage/l/aaRAIDPage 1.htm.

Doctor Wallace, ("Re: 1/infinity"), Mar. 16, 2003, pp. 1-3, http://mathforum.org/library/drmath/view/62486.html.

Math Is Fun Forum, ("One Divided by Infinity"), May 30, 2005, pp. 1-6, http://mathforum.com/viewtopic.php?id=730.

Tom's Hardware, ("Upgrading Hard Drive on Laptop—Most Painless Way to Tran."), Apr. 6, 2005, pp. 1-4, http://www.tomshardware.com/forum/30656-35-upgrading-hard-drive-laptop-painless-tran.

Computing.net, (Partitioning Raid 0), Apr. 30, 2004 through May 6, 2004, pp. 1-5, http://www.computing.net/answers/hardware/partitioning-raid-0/25167.html.

Gaisor, G (Mar. 9, 2005) "Intel's Matrix RAID Explored: Your Array is Ready, Mr. Anderson", located at http://techreport.com/articles.x/8059/1, last visited Jul. 15, 2011, 29 pages.

Ng, K. (Apr. 4, 2005) "Intel Matrix RAID Guide," located at http://www.techarp.com/showarticle.aspx?artno=206, last visited Jul. 15, 2011, 10 pages.

Tong, T. (Dec. 8, 2004) "Intel Matrix Storage," located at http://www.neoseekercom/Articles/Hardware/Features/intelmatrixich6r/ . . . ,last visited Jul. 15, 2011, 21 pages.

The PC Guide, "RAID Levels 0+1 (01) and 1+0(10)", Apr. 17, 2001, pp. 1-2, http://www.pcguide.com/ref/hdd/perf/raid/levels/multLevel01-c.html.

AC&NC, "RAID Level 0+1: High Data Transfer Performance", Jan. 5, 2005, pp. 1-2, http://web.archive.org/web/20050105014331/http://www.acnc.com/04_01_10.html.

* cited by examiner

VIRTUAL DRIVE MAPPING

RELATED APPLICATIONS

This application is a continuation of application Ser. No. 11/636,108, filed Dec. 8, 2006, which is hereby incorporated by reference in its entirety.

FIELD

This invention relates to the mapping of virtual drives to servers, and more particularly, to the automated mapping of virtual drives to servers in a system that allows for additional servers and physical drives to be subsequently added to the system in a manner that does not require any change to the original mapping.

BACKGROUND

Figure 1:
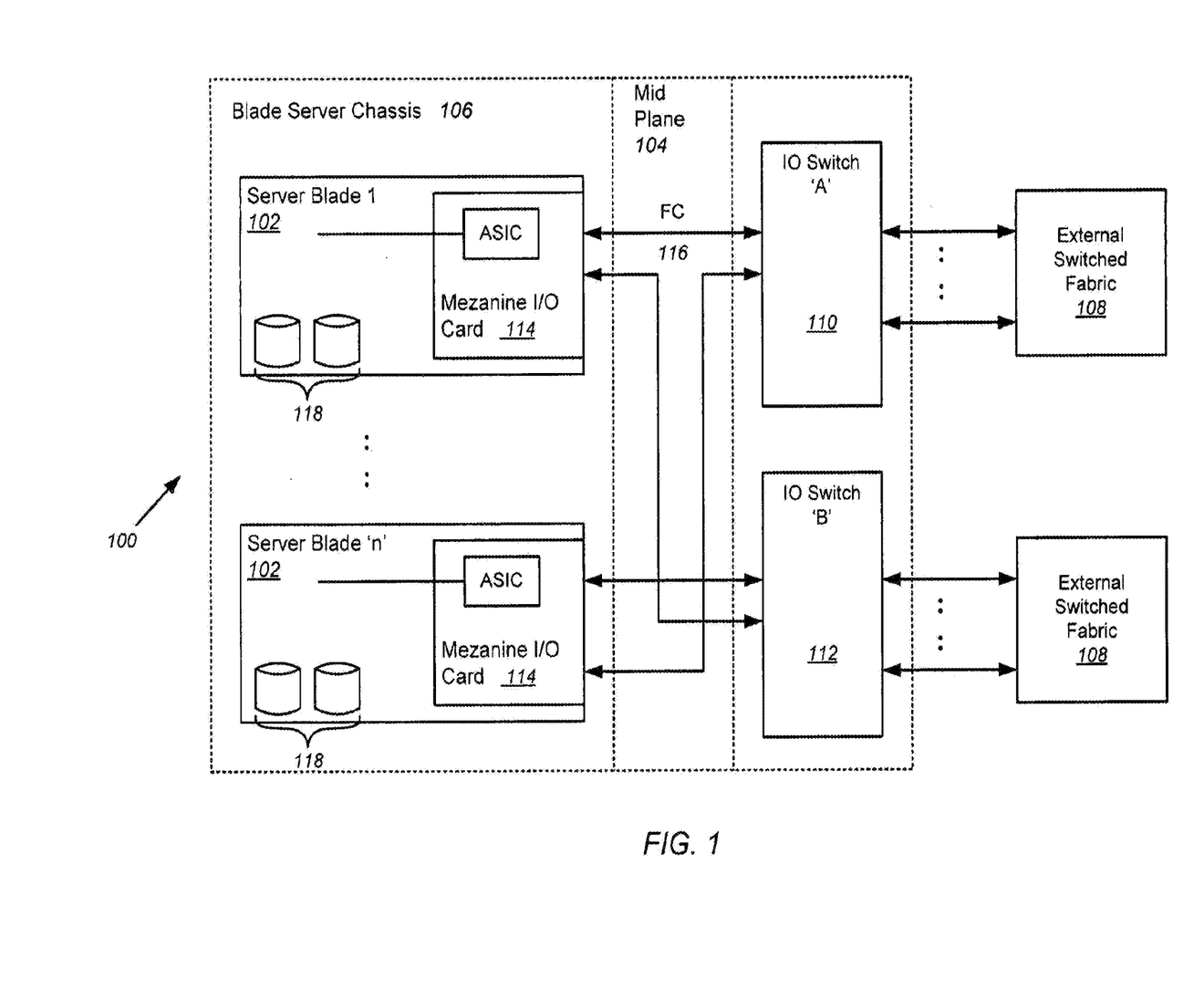
FIG. 1 is an exemplary illustration of a conventional blade server connected to an external switched fabric.

FIG. 1 is an exemplary illustration of a conventional blade server 100 connected to an external switched fabric. Blade servers overcome some of the inefficiencies of individual standalone or rack-mounted one unit (1 U) high servers, each of which is self-contained and includes separate power supplies, fans, and the like. Individual servers are therefore inefficient in terms of space, power, cooling, and other characteristics. Blade servers 100 utilize a modular, plug-in approach wherein the housing for each server is eliminated along with self-contained components such as power supplies and fans. Each previously standalone server is therefore reduced to a server "blade" 102 (typically eight to 14 in a blade server chassis 106) capable of being plugged into a midplane 104 within the blade server chassis 106 from the front of the chassis. The midplane 104 contains connectors for receiving the server blades 102 and typically contains from one to four "lanes" or paths on a Printed Circuit Board (PCB) for carrying signals. The midplane 104 therefore eliminates much of the cabling that was required with individual servers. The blade server chassis 106 also provides redundant common cooling and power to the server blades 102 through the midplane 104.

Conventional blade servers 100 may be connected to redundant external switch fabrics 108 through an "A" side Input/Output (I/O) switch 110 and a "B" side I/O switch 112, which plug into the midplane 104 from the back of the chassis 106. Typically, the redundancy enables one switch to take over if the other fails. In addition, the blade server midplane is typically plumbed to allow for multiple independent redundant fabrics or I/O protocols, such as Fibre Channel (FC), Serial Attached SCSI (SAS), SATA, Ethernet or InfiniBand. In the case of a FC configuration, each embedded switch 110 and 112 may be a FC Arbitrated Loop (FC_AL) switch or a full fabric switch, with a separate port to receive a FC link 116 from each of the multiple server blades 102, and output ports for connecting to each of the external switched fabrics 108.

To enable the server blades 102 to communicate with the switch fabric, typically a mezzanine I/O card 114 that performs a Host Bus Adapter (HBA) (a.k.a. I/O Controller (IOC)) function is required in each server blade 102. These mezzanine I/O cards 114 are typically mounted to the server blades 102 as daughter cards. Note that this may also be accomplished by embedding an IOC directly on the server blade. However, this increases complexity for the Original Equipment Manufacturer (OEM), who must now make a different server blade for each type of I/O that will be supported. For purposes of this specification, mezzanine I/O cards 114, referred to herein, include both daughter cards and IOCs mounted directly onto the server blade. The output of a mezzanine I/O card 114 is two I/O links 116 routed to each of the two embedded switches 110 and 112. The mezzanine I/O cards 114 follow the standard device driver model, so that when a server blade 102 with a mezzanine I/O card 114 is plugged into the midplane 104 and connected to an embedded switch 110 or 112, it appears to be a standalone server with a Peripheral Component Interconnect (PCI) card communicating with an external switch.

Each conventional server blade 102 has traditionally included two disk drives 118 for redundancy. However, the compact nature of blade servers 100 and the desired small size of the server blades 102 means that the two disk drives 118 normally contained in each server blade take up valuable space.

Modern disk drives contain more storage capacity that is typically needed by a server blade, and thus diskless server blades have been developed in which the physical disk drives are located either in another board within the blade server (an "embedded" implementation) or even in an enclosure outside the blade server (e.g. a storage array connected to the blade server). One company that makes diskless server blades for non-FC applications is Engenera.

Diskless server blades boot off of virtual drives, which are formed within the physical drives. The mapping of server blades and virtual drives has conventionally been a manual process involving adjusting Basic Input/Output System (BIOS) settings and setting up the storage array with a World-Wide Port Name (WWPN) that maps to the server blades and the blade server.

Heretofore, in both blade server and non-blade server applications, there has been no way to automatically create virtual drives and map servers to the virtual drives. However, if the maximum number of allowable servers and drives is known, then a processor executing firmware either within one of the servers or external to the servers can automatically create virtual drives from existing physical drives, map them to existing servers, and allow for servers and drives to be subsequently added to the system (up to the maximum allowable numbers) without disrupting the mapping.

Therefore, there is a need to automatically create virtual drives from existing physical drives and map existing servers to the virtual drives when the maximum number of allowable servers and drives is known, and also to allow for additional servers and drives (up to the maximum allowable numbers) to be added and mapped without disrupting the original mapping.

SUMMARY

Embodiments of the present invention are directed to automatically mapping a set of physical drives to a larger number of virtual drives for use by a set of computer servers. Users of this invention will save costs, space and power by using fewer physical drives than the number of physical servers.

Given a maximum set of n physical servers, denoted $S_1$-$S_n$, and a maximum set of m physical drives, denoted $D_1$-$D_m$, embodiments of the present invention define a set of algorithms implemented in firmware to automatically create and map a set of virtual drives, denoted $V_1$-$V_n$, to the physical drives $D_1$-$D_m$, given the following assumptions: (1) the maximum number of supported servers, n, is fixed and known, (2) the maximum number of supported physical drives, m, is fixed and known, and (3) one virtual drive is created per server (i.e. n total virtual drives are presented).

In the virtual drive mapping algorithm, all virtual drives are the same size. Striping (also known as a Redundant Array of Independent Disks 0 (RAID 0)) is used to map, the virtual drives to the physical drives. Physical drives are organized into "Stripe Sets," with each Stripe Set containing an equal number of physical drives. There are a maximum of p Stripe Sets denoted $SS_1$-$SS_p$. Because each Stripe Set has an equal number of drives, the maximum number of physical drives m, must be divisible by the maximum number of Stripe Sets, p, with m/p physical drives per Stripe Set.

To automatically configure a maximum set of m physical drives into a maximum set of n virtual drives, the number of physical drives currently installed in the system, NUMdrives, and the size (capacity) in bytes of the installed physical drives is first discovered by querying each drive for its capacity. The smallest reported capacity of any of the physical drives, Dsize, is then assumed to be the capacity of all physical drives that are installed, or will be installed, in the system.

Because there are a maximum of n virtual drives supported by a maximum of in physical drives of size Dsize, and all virtual drives are the same size, each virtual drive will have a size, Vsize, equal to the maximum total size of all physical drives, m times Dsize, divided by the maximum number of virtual drives n, rounded down to the nearest integer. In other words, Vsize=(m*Dsize)/n (rounded down to the nearest integer).

Next, the number of Stripe Sets must be selected. A default value for the number of Stripe Sets may be used to provide automatic configuration. The number of Stripe Sets, p, must be greater than or equal to 1, and less than or equal to the maximum number of physical drives m, with m being divisible by p. In other words, $1 \leq p \leq m$, where m is divisible by p.

By default, embodiments of the present invention may select the number of Stripe Sets, p, to yield the smallest number of physical drives per Stripe Set greater than 1. Each Stripe Set has a size, SSsize, equal to the size of a single physical drive Dsize multiplied by the number of physical drives in a stripe set, m/p. In other words, SSsize=Dsize*m/p (rounded down to the nearest integer).

Virtual drives are mapped sequentially to Stripe Sets, starting with $V_1$ mapped to $SS_1$. Successive virtual drives are mapped to the Stripe Sets, in order, until all virtual drives have been mapped to a Stripe Set.

Next, a validation step may be performed in which computations are made to determine if any of the configuration assumptions are being violated. To validate the configuration, the number of drives present, NUMdrives, determined above, must be checked to ensure that it maps into an integer number of Stripe Sets. In other words, the number of physical drives present, NUMdrives, must be a multiple of the number of drives in a Stripe Set, m/p.

The actual number of servers present, NUMservers, must be discovered by querying the interconnect to the servers. Next, to ensure that the number of servers present, NUMservers, can be supported by the number of physical drives present, NUMdrives, the virtual drives are mapped to the physical drives as described above.

If the configuration is not valid for any of the above reasons, the user may be notified of the cause of the problem, and provided with instructions to create a valid configuration. Typically, a valid configuration can be reached by adding a number of physical drives until all requirements are satisfied.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Although embodiments of the present invention are described herein in terms of blade servers and server blades, it should be understood that the present invention is not limited to blade servers and server blades, but is generally applicable to any multiple-server system employing virtual drives. In addition, the present invention is not limited to systems that support FC, but includes InfiniBand, Ethernet, Serial Attached Small Computer System Interconnect (SAS) signaling and the like. Implementation of these protocols requires that the midplane or other connectivity support the protocols.

Embodiments of the present invention are directed to automatically mapping a set of physical drives to a larger number of virtual drives for use by a set of computer servers. Users of this invention will likely save costs by using fewer physical drives than the number of physical servers.

Figure 2:
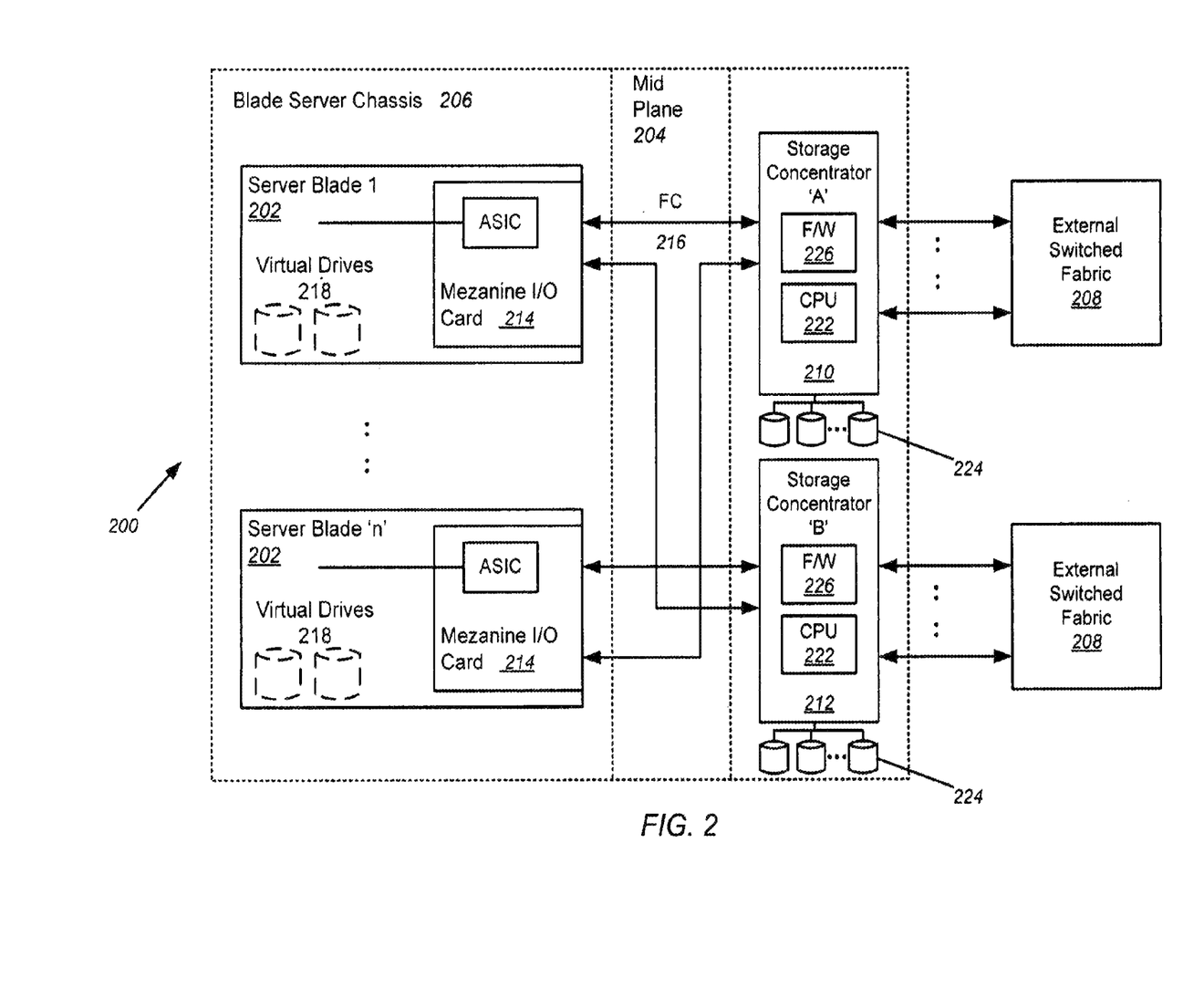
FIG. 2 is an illustration of an exemplary blade server employing diskless server blades coupled through a midplane to storage concentrators in a purpose-built embodiment capable of supporting the present invention.

FIG. 2 is an illustration of an exemplary blade server 200 employing diskless server blades 202 coupled through a midplane 204 to storage concentrators 210 and 212 in a purpose-built embodiment capable of supporting the present invention. The storage concentrators 210 and 212 may include I/O switch functionality and a CPU 222, and may be connected to physical drives 224 within the blade server 200, or alternatively may connect to physical drives located outside the blade server. The storage concentrators 210 and 212 connect the diskless server blades 202 to redundant external FC links 220. The CPU 222 within each storage concentrator 210 and 212 executes the firmware 226 of the present invention. The firmware 226 will create virtual drives 218 that are associated with each of the diskless server blades 202.

Figure 3:
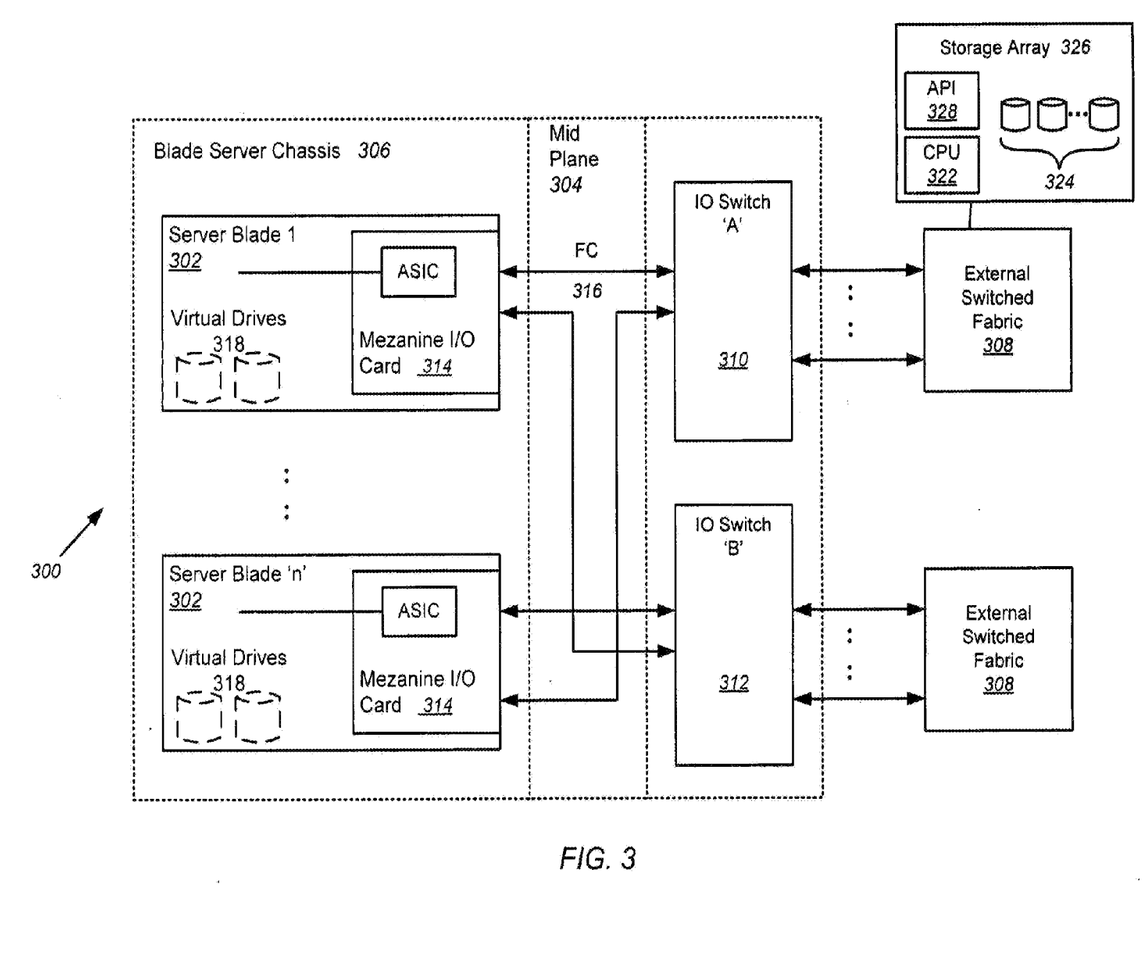
FIG. 3 is an illustration of an exemplary blade server employing diskless server blades coupled through a midplane to I/O switches to external storage arrays in an alternative embodiment capable of supporting the present invention.

FIG. 3 is an illustration of an exemplary blade server 300 employing diskless server blades 302 coupled through a midplane 304 to I/O switches 310 and 312 in an alternative embodiment capable of supporting the present invention. In FIG. 3, a storage array 326 separate from the blade server 300 may contain the physical drives 324, a processor 322, and an Application Programming Interface (API) 328 including firmware for automatically performing virtual drive creation and mapping according to embodiments of the present invention. The firmware will create virtual drives 318 that are associated with each of the diskless server blades 302.

It should be noted that FIGS. 2 and 3 illustrate two exemplary systems capable of employing embodiments of the present invention. In general, the functionality of the present invention may be implemented in firmware, an API, or any other type of computer program that may be executed by a processor or CPU or other instruction-processing device or circuit located in any switching device, storage concentrator or storage array in a system utilizing the concept of virtual drives or devices.

Figure 4:
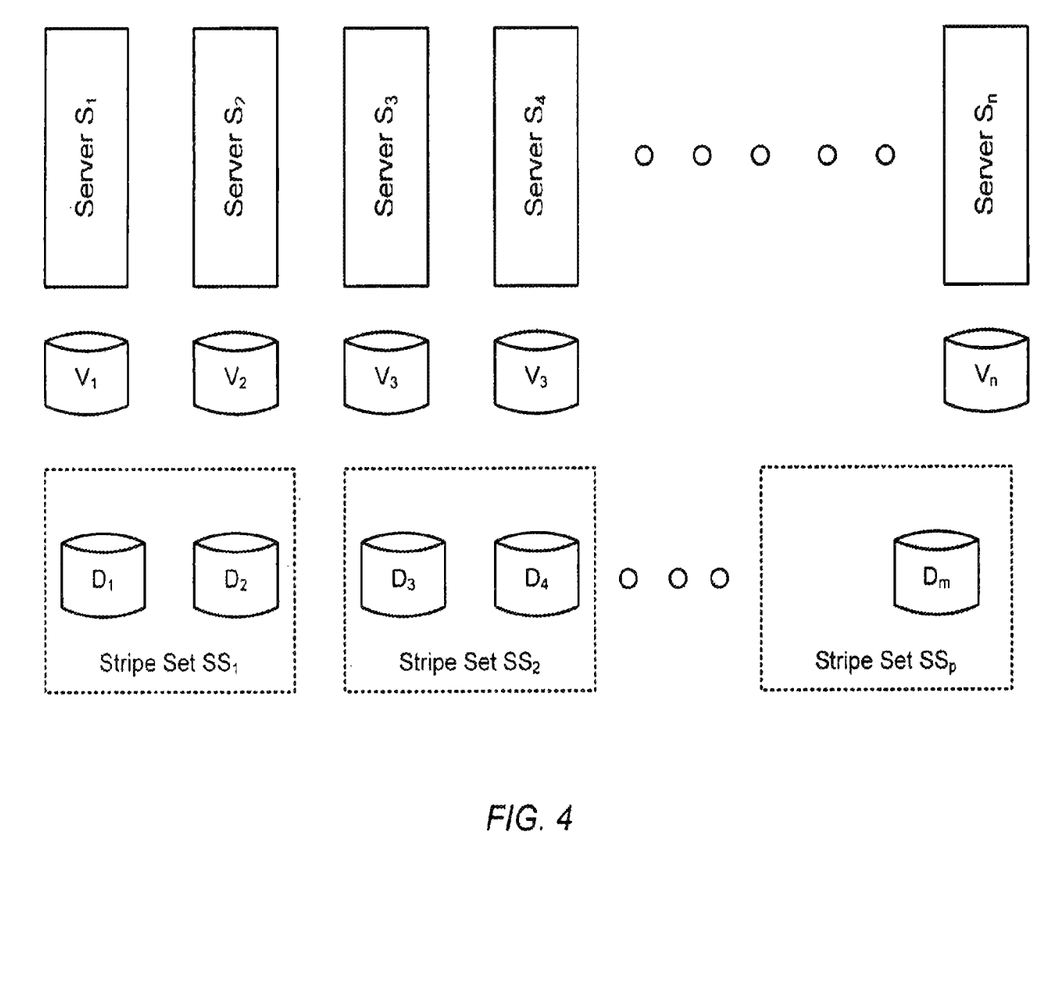
FIG. 4 is a conceptual illustration of the mapping of servers to virtual drives according to embodiments of the present invention.

FIG. 4 is a conceptual illustration of the mapping of servers to virtual drives according to embodiments of the present invention. FIG. 4 shows a maximum set of n physical servers, denoted $S_1$-$S_n$, and a maximum set of m physical drives, denoted $D_1$-$D_m$. For purposes of comparison and correlation to an actual physical system, the servers $S_1$-$S_n$ in FIG. 4 correlate to the server blades 202 in FIG. 2 or the server blades 302 in FIG. 3, and the physical drives $D_1$-$D_m$ in FIG. 4 correlate to the physical drives 224 connected to one of the storage concentrators 210 or 212 in FIG. 2, or correlate to the physical drives 324 in storage array 326 in FIG. 3.

Embodiments of the present invention define a set of algorithms implemented in firmware to automatically create and map a set of virtual drives (denoted $V_1$-$V_n$ in FIG. 4) given the following assumptions: (1) the maximum number of supported servers, n, is fixed and known, (2) the maximum number of supported physical drives, m, is fixed and known, and (3) one virtual drive is created per server (i.e. n total virtual drives are presented). The n and m values may be provided to the firmware of the present invention. These assumptions enable virtual drives to be created and mapped to servers using current quantities of servers and physical drives, and allows for adding servers and physical drives up to the maximum numbers n and m without having to perform any re-mappings of virtual drives to servers. In alternative embodiments, there may be more than one virtual drive per server. The actual number of virtual drives present at any time is of course limited by the actual number of servers installed in the system.

In the virtual drive mapping algorithm, all virtual drives are the same size. Alternative embodiments may support different size virtual drives. (Size means the capacity, in bytes, of a drive, virtual or physical). Any number of servers, from 1 to n, can be supported. In general, a user would start with a smaller number of servers and add servers over time. When adding servers, the size of existing virtual drives remains fixed. Virtual drive sizes are not reduced.

Striping (also known as a Redundant Array of Independent Disks 0 (RAID 0)) is used to map the virtual drives to the physical drives. Striping is a technique to distribute data from a single virtual drive to multiple physical drives. Physical drives are organized into "Stripe Sets," with each Stripe Set containing an equal number of physical drives. There are a maximum of p Stripe Sets denoted $SS_1$-$SS_p$ in the example of FIG. 4. Because each Stripe Set has an equal number of drives, the maximum number of physical drives m, must be divisible by the maximum number of Stripe Sets, p, with m/p physical drives per Stripe Set. Any actual number of Stripe Sets, from 1 to p, can be supported, provided that enough actual Stripe Sets are present to support the number of servers present. It should be noted that FIG. 4 shows two physical drives per Stripe Set as an example only; other numbers of physical drives per Stripe Set are possible.

To automatically configure a maximum set of m physical drives into a maximum set of n virtual drives, the number of physical drives currently installed in the system, NUMdrives, and the size (capacity) in bytes of the installed physical drives is first discovered by querying each drive for its capacity. Query methods depend on the specific protocol being used, and the invention does not depend on any specific query method. As an example, the "Read Capacity" command can be used in the SCSI protocol to determine the block size and total number of blocks on a drive. The smallest reported capacity of any of the physical drives, Dsize, is then assumed to be the capacity of all physical drives that are installed, or will be installed, in the system. Note that using the smallest size of a single drive as the capacity of all drives leaves unused capacity on drives larger than Dsize, but simplifies the mapping algorithm and allows for expansion of the number of installed servers and physical drives (up to the assumed maximums n and m) without requiring re-mapping. If less than m physical drives are present during the initial discovery, then any new drives added must have a size greater than or equal to Dsize. If the new chive has a size smaller than Dsize, it results in an unsupported configuration. In this case, the user may be notified of the error, and provided with instructions to replace the drive with a different drive of capacity greater than or equal to Dsize.

Because there are a maximum of n virtual drives supported by a maximum of in physical drives of size Dsize, and all virtual drives are the same size, each virtual drive will have a size, Vsize, equal to the maximum total size of all physical drives, m times Dsize, divided by the maximum number of virtual drives n, rounded down to the nearest integer. In other words, Vsize=(m*Dsize)/n (rounded down to the nearest integer).

Next, the number of Stripe Sets must be selected. The use of Stripe Sets, while optional, allows the flexibility to upgrade the number of physical drives as long as entire Stripe Sets are added at a time. Because physical drives must be added in quantities equal to complete Stripe Sets, the number of drives in a Stripe Set represents a "cost granularity" to the user. However, having more drives in a Stripe Set improves performance because it is faster to access information from multiple physical drives at the same time, so there is a trade off between cost granularity and performance. A default value for the number of Stripe Sets will be used to provide automatic configuration, although in alternative embodiments users can specify a different value to optimize cost granularity vs. performance for a given application. The number of Stripe Sets, p, must be greater than or equal to 1, and less than or equal to the maximum number of physical drives m, with m being divisible by p. In other words, $1 \leq p \leq m$, where m is divisible by p.

By default, embodiments of the present invention may select the number of Stripe Sets, p, to yield the smallest number of physical drives per Stripe Set greater than 1. Thus, if there is only one physical drive, then there will be one Stripe Set with one physical drive per Stripe Set. Note that if the maximum number of physical drives, m, is prime, then by default there will be only one Stripe Set with m physical drives per Stripe Set, resulting in the highest cost granularity. In alternative embodiments, other methods may be used to select the default number of Stripe Sets.

Each Stripe Set has a size, SSsize, equal to the size of a single physical drive Dsize multiplied by the number of physical drives in a stripe set, m/p. In other words, SSsize=Dsize*m/p (rounded down to the nearest integer).

The next step is to map the virtual drives to the physical drives. Physical drives are added to the system a Stripe Set at a time. Each Stripe Set can support a number of physical servers determined by the number of virtual drives that fit within a Stripe Set. Virtual drives are mapped sequentially to Stripe Sets, starting with $V_1$ mapped to $SS_1$. Virtual drives continue to be mapped to $SS_1$ until $SS_1$ does not have enough capacity left to support another virtual drive. The number of whole virtual drives mapped to $SS_1$ is equal to the size of a Stripe Set divided by the size of a virtual drive, rounded down to the nearest integer. In other words, the number of whole virtual drives mapped to $SS_1$ is equal to SSsize/Vsize= $(Dsize*m/p)/((m*Dsize)/n)=(m/p)/(m/n)=n/p$, rounded down to the nearest integer.

Unused capacity in $SS_1$ is combined with enough capacity from the second Stripe Set $SS_2$ to support the next sequential virtual drive. Virtual drives continue to be mapped to $SS_2$ until it no longer has enough capacity to support the next virtual drive. This iterative process continues under control of firmware until all virtual drives have been mapped. During this process, because the firmware knows the size of each virtual drive, Vsize, and the size of each Stripe Set, SSsize, it can track how much of each Stripe Set is "consumed" as each successive virtual drive is mapped to it, and in this manner iteratively determine which successive whole and partial virtual drives are mapped to successive Stripe Sets using straightforward calculations easily implemented by those skilled in the art. One example of this process is as follows: (1) map first virtual drive to first Stripe Set; (2) compute remaining space in Stripe Set; (3) as long as remaining space in Stripe Set≥Vsize, map next virtual drive to Stripe Set, compute new remaining space in Stripe Set, and repeat step (3); (4) when remaining space in Stripe Set<Vsize, map portion of next virtual drive equal to remaining space in Stripe Set to the Stripe Set, and map the remaining space in next virtual drive to next Stripe Set; and (5) repeat steps (2) through (4) until last virtual drive has been mapped to last Stripe Set.

Users may need to know how many total servers can be supported by a given number of Stripe Sets. If the number of installed Stripe Sets is s, the number of supported servers equals the total capacity of all installed Stripe Sets divided by the size of a virtual drive, rounded down to the nearest integer. From the equation above, the number of supported servers=s*n/p (rounded down to the nearest integer).

Figure 5:
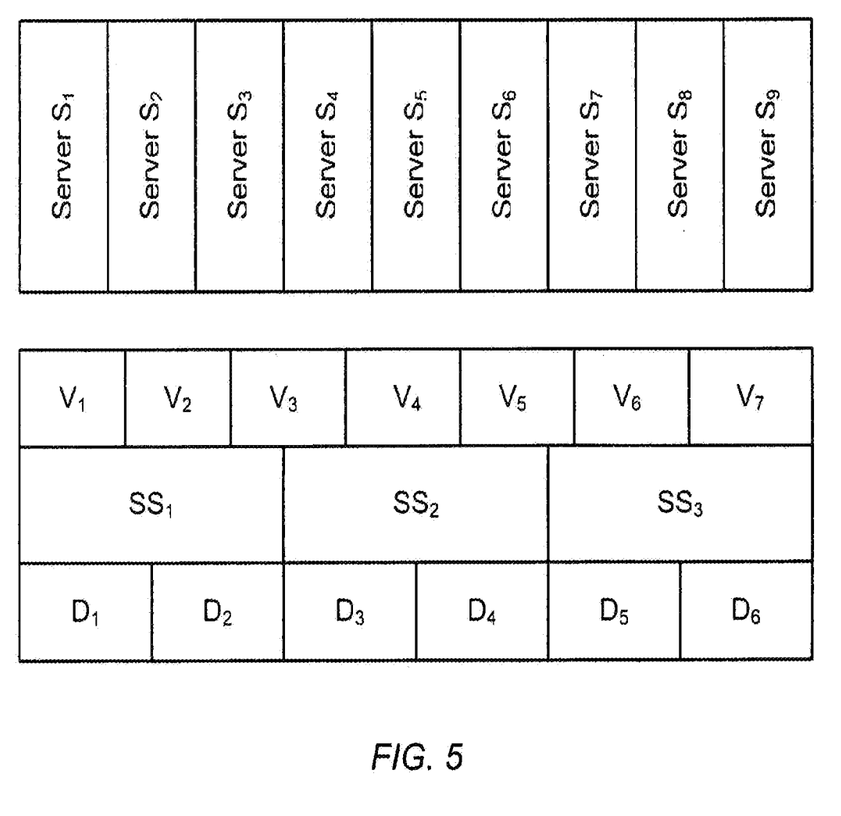
FIG. 5 is an illustration of an exemplary mapping of servers to virtual drives according to embodiments of the present invention.

FIG. 5 is an illustration of an exemplary mapping of servers to virtual drives according to embodiments of the present invention. FIG. 5 illustrates an example with a maximum of seven servers, six physical drives, and three Stripe Sets. In this example, it is possible to have one, two, three or six Stripe Sets, given the maximum of six physical drives. A default of three Stripe Sets is used because it gives two physical drives per Stripe Set (the smallest number of drives per Stripe Set greater than one). Given that there is a maximum of seven servers, seven virtual drives must be mapped, each having a size of ((6 physical drives)*Dsize)/7 virtual drives. Each Stripe Set has a size of 2*Dsize because there are two physical drives per Stripe Set. In the example of FIG. 5, $V_1$ and $V_2$ are mapped to $SS_1$. $V_3$ is mapped to the remaining capacity in $SS_1$ until all capacity in $SS_1$ is consumed, and the remainder of $V_3$ is mapped to $SS_2$. $V_4$ is mapped to $SS_2$. $V_5$ is mapped to the reminder of $SS_2$, until all capacity in $SS_2$ is consumed. The remainder of $V_5$ is mapped to $SS_3$. Finally, $V_6$ and $V_7$ are mapped to $S_3$. Given this mapping, supported configurations of actual numbers of physical drives and servers are shown in the following Table 1:

TABLE 1

| Number of Physical Drives Present | Number of Virtual Drives | Number of Servers Supported |
| --- | --- | --- |
| 1 | Not Supported | Not Supported |
| 2 | 2 | 1 or 2 |
| 3 | Not Supported | Not Supported |
| 4 | 4 | 1, 2, 3 or 4 |
| 5 | Not Supported | Not Supported |
| 6 | 7 | 1, 2, 3, 4, 5, 6 or 7 |

Next, a validation step is performed in which computations are made to determine if any of the configuration assumptions are being violated. For example, if only D1 was installed (one physical drive installed) in FIG. 5, this would be an invalid configuration (see Table 1) because each Stripe Set requires two physical drives.

To validate the configuration, the number of drives present, NUMdrives, determined above, must be checked to ensure that it maps into an integer number of Stripe Sets. The number of drives in each Stripe Set is equal to the maximum number of physical drives m, divided by the number of Stripe Sets p. The number of physical drives present, NUMdrives, must be a multiple of the number of drives in a Stripe Set, m/p. The number of Stripe Sets, s, is equal to the number of drives present, NUMdrives, divided by the number of drives in a stripe set, m/p. In other words, s=NUMdrives/(m/p).

The actual number of servers present, NUMservers, must be discovered by querying the interconnect to the servers. Specific query methods vary based on interconnect and protocol, and the invention is not dependent on the specific methods. As an example, in Fibre Channel a PLOGI command can be used to determine whether or not a server is present, and obtain the WWN of the server if present. Next, to ensure that the number of servers present, NUMservers, can be supported by the number of physical drives present, NUMdrives, the virtual drives are mapped to the physical drives as described above. Of course, the number of servers present, NUMservers, must be less than or equal to the number of supported servers, In other words, NUMservers<=s*n/p (rounded down to the nearest integer).

If the configuration is not valid for any of the above reasons, the user may be notified of the cause of the problem, and provided with instructions to create a valid configuration. Typically, a valid configuration can be reached by adding a number of physical drives until all requirements are satisfied.

The configuration may be re-validated as described above when drives or servers are added or removed. In particular, when drives are added, embodiments of the present invention may first verify that the size of all new drives is greater than or equal to Dsize.

Figure 6:
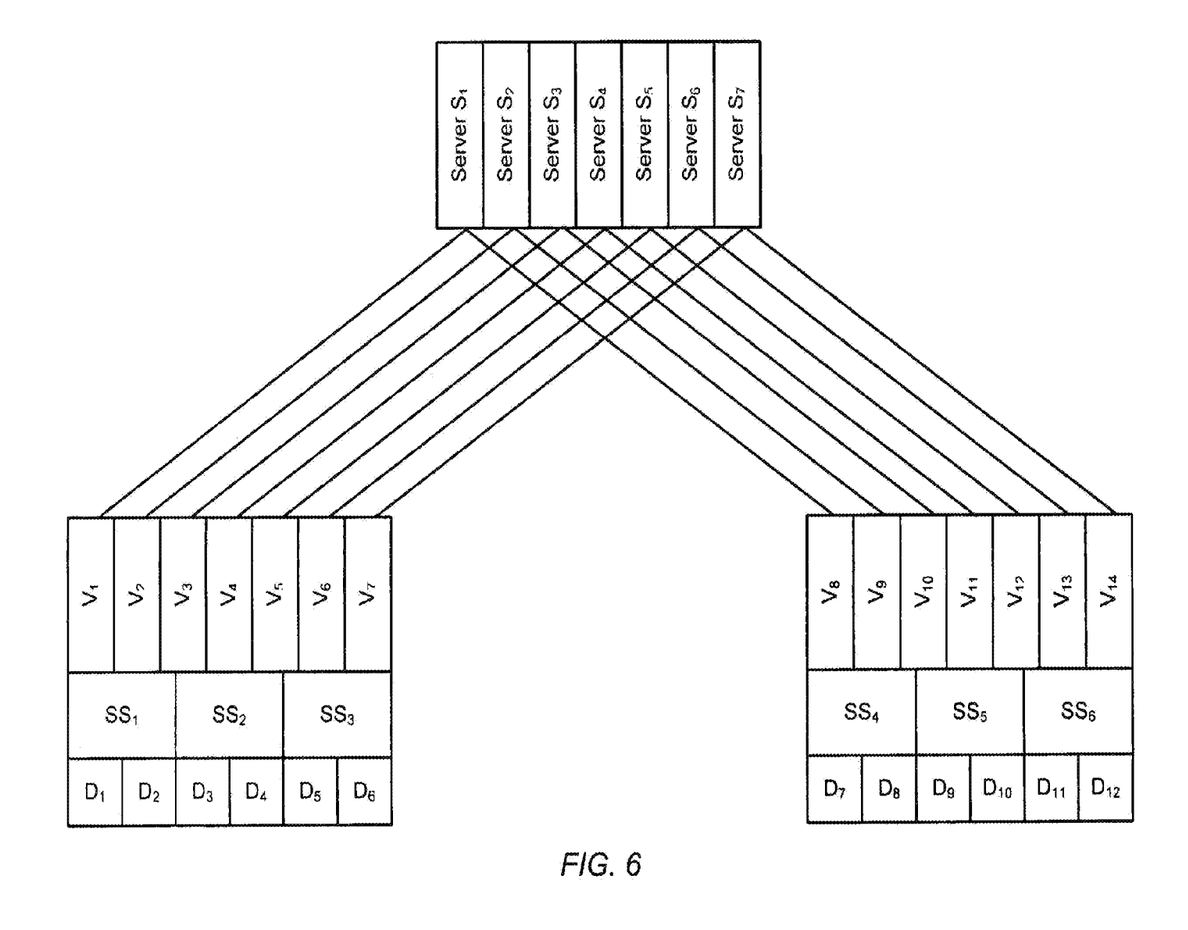
FIG. 6 is a conceptual illustration of the mapping of servers to virtual drives in a mirrored configuration according to embodiments of the present invention.

In alternative embodiments of the present invention illustrated symbolically in the example of FIG. 6, automated mapping of virtual drives to servers as described above may be used in a configuration that uses RAID 1 (mirroring) on each server to provide high availability. In the example of FIG. 6, two independent sets of physical drives $D_1$-$D_6$ and $D_7$-$D_{12}$ can be mapped using this invention to create two independent sets of virtual drives $V_1$-$V_7$ and $V_8$-$V_{14}$. Each server is mapped to two virtual drives of equal size, that in turn map to separate physical drives. RAID 1 on each server mirrors all writes to both virtual drives. Since all data is mirrored (copied) to both drives, no single drive failure will cause the system to fail.

In a RAID 1 application, the redundant virtual drives seen by each server should be equal in size. To achieve equal size virtual drives, each instance of the virtual drive mapping algorithm independently discovers the size of the lowest capacity physical drive present, Dsize. Each instance then communicates the Dsize it discovered, then both instances use the smaller of the two as a common Dsize. Additionally, when validating the configuration, both instances must communicate to ensure that the configuration present is supported.

Embodiments of the present invention can support more than one virtual drive per server, given a known maximum number of virtual drives. Such a variation might be useful to have multiple operating system images per server. For example, each server could have one virtual drive loaded with a Windows system image, and another virtual drive loaded with a Linux system image. Users could choose which virtual drive to use at boot time.

In a blade server environment, each physical port on an embedded storage concentrator is connected to a specific physical server slot. During the discovery process, a unique name (example: WWNN in Fibre Channel) is identified for each active server in each physical slot. A table can be created that saves the mapping of server names to physical slots. Each time a server is removed or inserted the invention can update the mapping table. If a server is removed from a physical slot and a new server is added with a different name in the same slot, the invention can detect this situation by comparing the server name of the new server with server name saved in the mapping table for that physical slot. Several options are possible for this situation. A user may desire that the existing virtual drive image be mapped to the new physical server to enable rapid restoration of existing applications on a new server when an existing server fails. The invention can be configured to automatically map an existing virtual drive and all of its data to a new physical server replacing a failed server in a specific physical slot. Additionally, if an existing server is moved from one physical slot to another physical slot, the invention can detect this case by searching the mapping table to find the server name of the server that was just inserted into a different slot. Since that server name was previously recorded in the mapping table in a different slot, the invention can detect that the server has been moved from one physical slot to another physical slot. In this case, one option is to map the existing virtual drive and all of its data to the new physical slot.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A storage system, comprising:
a plurality of physical drives grouped into a plurality of stripe sets, wherein each stripe set has an equal number of physical drives,
a blade server operable to create a first virtual drive,
wherein the blade server is operable to determine a common storage space size based on a smallest storage space size of a first of the plurality of physical drives in the storage system, to establish a storage space size of the first virtual drive that is less than the common storage space multiplied by a number of physical drives in the storage system, and to map the first virtual drive to a first of the stripe sets;
wherein the blade server is further operable to create a second virtual drive having a same storage space size of the first virtual drive, and to determine a remaining storage space size of the first stripe set, and wherein, if the remaining storage space size of the first stripe set is greater than zero bytes, the blade server is further operable to map at least a portion of the second virtual drive to the first stripe set, otherwise the blade server is further operable to map the second virtual drive to a second of the stripe sets.

2. The storage system of claim 1, further comprising:
another blade server operable to determine a remaining storage space size of the physical drives,
wherein, if the remaining storage space size of the physical drives is greater than a storage space size of the first virtual drive, the other blade server is further operable to create a third virtual drive having a same storage space size of the first virtual drive, and to map the third virtual drive to one or more of the stripe sets.

3. The storage system of claim 1, further comprising:
another plurality of physical drives grouped into one or more stripe sets.

4. The storage system of claim 1, wherein:
the blade server is further operable to determine the common storage space size through discovery of the physical drives.

5. The storage system of claim 1, wherein:
the blade server is further operable to determine a common virtual drive size for all virtual drives by multiplying the number of physical drives by the common storage space size in the storage system and dividing that number by a number of virtual drives in the storage system.

6. The storage system of claim 1, wherein:
the first stripe set comprises two or more physical drives.

7. The storage system of claim 6, wherein:
the blade server is further operable to determine a storage space size for the first stripe set by multiplying the common storage space size by an integer number of physical drives in the first stripe set.

8. A method operable in a storage system, the method comprising:
grouping a plurality of physical drives into a plurality of stripe sets, wherein each stripe set has an equal number of physical drives; and
via a blade server:
creating a first virtual drive;
determining a common storage space size based on a smallest storage space size of a first of the plurality of physical drives in the storage system;
establishing a storage space size of the first virtual drive that is less than the common storage space multiplied by a number of physical drives in the storage system;
mapping the first virtual drive to a first of the stripe sets;
creating a second virtual drive having a same storage space size of the first virtual drive;
determining a remaining storage space size of the first stripe set; and
if the remaining storage space size of the first stripe set is greater than zero bytes, mapping at least a portion of the second virtual drive to the first stripe set, otherwise mapping the second virtual drive to a second of the stripe sets.

9. The method of claim 8, further comprising:
via another blade server:
determining a remaining storage space size of the physical drives; and
if the remaining storage space size of the physical drives is greater than a storage space size of the first virtual drive, creating a third virtual drive having a same storage space size of the first virtual drive, and mapping the third virtual drive to one or more of the stripe sets.

10. The method of claim 8, further comprising:
grouping another plurality of physical drives into one or more stripe sets.

11. The method of claim 8, further comprising:
via the blade server, determining the common storage space size through discovery of the physical drives.

12. The method of claim 8, further comprising:
via the blade server, determining a common virtual drive size for all virtual drives by multiplying the number of physical drives by the common storage space size in the storage system and dividing that number by a number of virtual drives in the storage system.

13. The method of claim 8, wherein:
the first stripe set comprises two or more physical drives.

14. The method of claim 13, further comprising:
via the blade server, determining a storage space size for the first stripe set by multiplying the common storage space size by an integer number of physical drives in the first stripe set.

15. A non-transitory computer readable medium comprising instructions that, when executed by one or more processors in a storage system, direct the one or more processors to:
group a plurality of physical drives grouped into a plurality of stripe sets, wherein each stripe set has an equal number of physical drives; and
via a blade server:
create a first virtual drive;
determine a common storage space size based on a smallest storage space size of a first of the plurality of physical drives in the storage system;
establish a storage space size of the first virtual drive that is less than the common storage space multiplied by a number of physical drives in the storage system;
map the first virtual drive to a first of the stripe sets;
create a second virtual drive having a same storage space size of the first virtual drive;
determine a remaining storage space size of the first stripe set; and
if the remaining storage space size of the first stripe set is greater than zero bytes, map at least a portion of the second virtual drive to the first stripe set, otherwise map the second virtual drive to a second of the stripe sets.

16. The computer readable medium of claim 15, further comprising instructions that direct the one or more processors to:
via another blade server:
determine a remaining storage space size of the physical drives; and
if the remaining storage space size of the physical drives is greater than a storage space size of the first virtual drive, create a third virtual drive having a same storage space size of the first virtual drive, and map the third virtual drive to one or more of the stripe sets.

17. The computer readable medium of claim 15, further comprising instructions that direct the one or more processors to:
group another plurality of physical drives into one or more stripe sets.

18. The computer readable medium of claim 15, further comprising instructions that direct the one or more processors to:
via the blade server, determine the common storage space size through discovery of the physical drives.

19. The computer readable medium of claim 15, further comprising instructions that direct the one or more processors to:
via the blade server, determine a common virtual drive size for all virtual drives by multiplying the number of physical drives by the common storage space size in the storage system and dividing that number by a number of virtual drives in the storage system.

20. The computer readable medium of claim of claim 15, wherein:
the first stripe set comprises two or more physical drives; and
the computer readable medium further comprises instructions that direct the one or more processors to, via the blade server, determine a storage space size for the first stripe set by multiplying the common storage space size by an integer number of physical drives in the first stripe set.

* * * * *